United States Patent
Meyer et al.

[11] Patent Number: 6,139,898
[45] Date of Patent: Oct. 31, 2000

[54] FULL MOISTURE SHELF STABLE RICE PRODUCT

[75] Inventors: Paul Philipp Meyer, Benglen; Peter Jonas Halden, Seuzach, both of Switzerland; Göran Jaelminger, Helsingborg; Eva Ehrenberg, Löddeköpinge, both of Sweden

[73] Assignee: Nestec S.A., Vevey, Switzerland

[21] Appl. No.: 09/280,042

[22] Filed: Mar. 26, 1999

[30] Foreign Application Priority Data

Mar. 27, 1998 [EP] European Pat. Off. ............. 98200964

[51] Int. Cl.[7] .......................... A23L 1/168; A23L 1/172; A23L 1/18; A23B 4/03
[52] U.S. Cl. .................. 426/618; 426/114; 426/268; 426/303; 426/309; 426/310; 426/316; 426/399; 426/407; 426/509
[58] Field of Search .................. 426/113, 114, 426/293, 303, 309, 316, 310, 618, 629, 654, 399, 407, 509, 510, 268

[56] References Cited

U.S. PATENT DOCUMENTS

| | | | |
|---|---|---|---|
| 2,195,165 | 3/1940 | Choppin et al. | 53/21 |
| 4,649,055 | 3/1987 | Kohlwey | 426/489 |
| 4,902,528 | 2/1990 | Groesbeck et al. | 426/625 |
| 5,089,281 | 2/1992 | Baz et al. | 426/461 |
| 5,293,814 | 3/1994 | Vorwerck et al. | 99/355 |
| 5,562,938 | 10/1996 | Lee et al. | 426/106 |
| 5,702,745 | 12/1997 | Yang et al. | 426/242 |
| 5,997,930 | 12/1999 | Kendall et al. | 426/460 |

FOREIGN PATENT DOCUMENTS

| | | |
|---|---|---|
| 0 322 996 | 7/1989 | European Pat. Off. . |
| 2 130 906 | 10/1972 | France . |
| 2 502 907 | 3/1982 | France . |
| 52-122645 | 10/1977 | Japan . |
| 3087153 | 4/1991 | Japan . |
| 990063 | 4/1965 | United Kingdom . |

OTHER PUBLICATIONS

S.L. Bor: "Rice: Production and Utilization" 1980. AVI, USA XPO002068550, pp. 566–574, 593–597.

*Primary Examiner*—Nina Bhat
*Attorney, Agent, or Firm*—Pennie & Edmonds LLP

[57] ABSTRACT

A full moisture shelf stable rice product, which comprises a cooked or precooked whole grain rice having a dry matter content of from about 30% to about 55% by weight, an acid in amount effective to obtain a pH of about 3.5 to about 4.5, and an oil in an amount sufficient to coat the surface of the rice.

16 Claims, No Drawings

FULL MOISTURE SHELF STABLE RICE PRODUCT

TECHNICAL FIELD

The present invention relates to a rice product consisting of cooked or precooked whole grain rice having a long shelf life.

BACKGROUND ART

JP52122645 (DAINIPPON PRINTING) discloses the preparation of sterilized boiled rice, by filling a container with rice and 40% to 55% water in heat-resistant pouches or cans, sealing them tightly, and cooking and sterilizing them simultaneously by heating with rotating.

FR2502907 (BUITONI) discloses the production of precooked solid food, especially pasta products and rice, by precooking the food in acidulated water, cooling in acidulated water, draining off excess water, oiling, insertion into flexible containers and heat sterilizing the sealed containers.

JP3087153 (ASAHI CHEM IND) discloses the preparation of packaged processed rice with good preservability, by heating rice, controlling its acidity to within a pH range of 3.5 to 6 and its moisture content to within 20% to 30%, and preventing grains from aggregation by light crushing.

SUMMARY OF THE INVENTION

The present invention relates to a full moisture shelf stable whole grain rice having outstanding organoleptical quality which is not intended to be fully cooked by the consumer but, on the contrary, is intended to be consumed after unpacking and simple heating or short cooking.

In addition, the present invention provides a process for manufacturing a full moisture shelf stable whole grain rice of outstanding quality which is intended to be consumed after unpacking and simple heating or short cooking.

The full moisture shelf stable rice product according to the present invention has a pH range of about 3.5 to about 4.5, preferably about 3.8 to about 4.3, and comprises a cooked or precooked whole grain rice having a dry matter content of from about 30% to about 55% by weight. The rice product also contains an acid in amount effective to obtain a pH of about 3.5 to about 4.5, and an oil in an amount sufficient to coat the surface of the rice.

The process for manufacturing a full moisture shelf stable rice product according to the present invention comprises the steps of water soaking whole grain rice, portioning, blanching, water cooling, dipping into acidified water, oiling, packaging, and in pack pasteurising of the rice product.

DETAILED DESCRIPTION OF THE PREFERRED EMBODIMENTS

In the present rice product, the whole grain rice may be of any commercially available rice kind or variety. It may especially be a short grain rice such as Italian Camolino rice, a parboiled white long grain rice, a Thai long grain fragrant rice or a Basmati rice.

The acid may be any food grade acid, especially lactic acid, phosphoric acid, citric acid, or Glucono-delta-lactone.

The oil may be any vegetable oil, and is advantageously present in an amount of from about 0.5% to about 5% by weight of the cooked or precooked grain. The oil may especially be peanut oil, rapeseed oil, sunflower oil, palm oil, corn oil, palm olein or mixtures thereof. About 0.5% to about 2% of emulsifiers, in percent by weight of the oil, and especially a monoglyceride or mixtures of monoglycerides, may advantageously be added to the oil to assist in coating the surface of the rice grains.

To implement the present process, one can start with a raw material in the form of a commercially available whole grain rice typically having a dry matter content of from about 86% to about 91%.

This rice may be soaked at a ratio of about one part of rice to about one to four parts of water at about 30° C. to 60° C. for about 30 minutes to about 5 hours. The purpose of the soaking step is to minimize starch losses and to open up the structure of the grain in order to facilitate the heat transfer as well as the water uptake during the blanching step.

During the soaking step, the water uptake may be such that the rice attains a dry matter content of from about 65% to about 72%.

The step of portioning, namely dividing or dosing the rice into portions which then will be individually packaged, may be carried out at any stage after the soaking step and before the packaging step.

The soaked rice may be blanched by steaming or by steaming and hot water-spraying, especially hot acid water-spraying, the purpose of water-spraying during steaming being to minimise starch losses during blanching.

The blanching step may be carried out at about 95° C. to about 100° C. for about 1 minute to about 10 minutes, while steaming with steam at about 98° C. to about 100° C. and spraying water at about 95° C. to about 98° C., especially water having a pH range of from about 3.5 to about 5. Spraying acidified water during blanching achieves a whiter color of the rice.

During the blanching step, the water uptake may be such that the rice achieves a dry matter content of between about 35% to about 52%.

After the blanching step, the rice may be advantageously showered with a hot water spray. In other words, the rice may be passed under a shower of hot water, especially of water having a temperature of from about 60° C. to about 70° C., in order to loosen the individual grains which can be slightly sticky after having been steamed.

Water cooling may be carried out in a bath of water at ambient temperature, namely at a temperature of between about 18° C. to about 35° C., for about 30 seconds to about 2 minutes.

After water cooling, excess water may be drained off for about 30 seconds to about 2 minutes.

During the water cooling step, the blanching step may be stopped completely and the water uptake may be such that the rice has a dry matter content of between about 30% to about 55%.

After water cooling and possibly draining off excess water, the rice is dipped into acidified water in order to be acidified to a final pH which is within the range of about 3.5 to about 4.5. To this end, the rice may be dipped into a water containing from about 0.5% to about 2% of a food grade acid, especially lactic acid, phosphoric acid, citric acid, or Glucono-delta-lactone, at ambient temperature, especially at a temperature of from about 18° C. to about 35° C., for from about 50 seconds to about 250 seconds.

After this acidifying step, excess acidified water may be drained off for about 30 seconds to about 2 minutes.

During the acidifying step, there is very little further water uptake. The acidification of the rice appears to be mainly a result of osmotic equilibration.

The oiling step may be carried out so that the surface of the rice is coated with oil in an amount of from about 0.5% to about 5% by weight of the rice. In order that the oil is well distributed in very fine particles over the rice surface, about 0.5% to about 2% of emulsifiers, in percent by weight of the oil, may be added to the oil.

The oiling step may be carried out either before or during the packaging step. Preferably, the rice is packaged in a flexible pouch with a controlled volume of head space. To this end, the rice may be dosed into a vertical pouch after its bottom has been sealed and oil may be injected into the pouch before its top is sealed.

Eventually the packaged rice product is in pack pasteurized. This in pack pasteurizing step may be carried out using a steam medium, while maintaining the temperature in the center of the pouch at from about 80° C. to about 100° C. for from about 1 minute to about 80 minutes.

The pouches may then be cooled either for about 5 minutes to about 15 minutes in cold water containing a disinfectant, or for about 30 minutes to about 60 minutes by chilled air, at about 5° C. to about 15° C.

The present process may be implemented by means of normal equipment such as steeping unit, steam/water spraying blancher, water bath, shower and pasteurizing unit from the pasta or noodle industry.

The present process surprisingly provides a rice product having outstanding organoleptical properties, especially an outstanding texture, in view of the fact that it is not intended to be actually cooked again at the consumer's end but only heated up or cooked for a very short period after unpacking.

Heating up or quickly cooking the present rice product after unpacking may be carried out in a pan, in a microwave oven, or by pouring hot or boiling water onto it.

EXAMPLES

The rice product and the process according to the present invention are illustrated in the following Examples in which the percentages and parts are by weight unless otherwise stated.

Example 1

A precooked rice product having a long shelf life was made from a commercially available long grain Thai fragrant rice having a dry matter content of 89.5%.

The rice was soaked at a rate of one part of rice for three parts of soft water at 50° C. for 1 h. The water uptake during soaking was such that the rice had a dry matter content of from about 67.9%.

The rice was portioned or dosed in 84 g portions.

The rice was then blanched at about 98° C. for 6 minutes along a tunnel blancher in which steam injection means injected steam at 99° C. and water spraying means sprayed acidified water having a pH range of 4.0 to 4.5 and a temperature of 96 to 97° C.

During the blanching step, the water uptake was such that the rice had a dry matter content of 51.9%.

After the blanching step, the rice was water cooled in a bath of water at 20° C. for 45 seconds.

During the water cooling step, the water uptake was such that the rice had a dry matter content of 43.3%.

After water cooling, excess water was drained off for 60 seconds.

The rice was then dipped into water containing 0.8% lactic acid and having a temperature of 30° C., for 105 seconds.

During the acidifying step, the water uptake was such that the rice had a dry matter content of 42.0%.

After the acidifying step, excess acidified water was drained off for 60 seconds.

After the acidifying step the rice had a pH of 3.9.

The rice portions then weighing about 140 g were dosed into vertical pouches after their bottoms had been sealed, and 1.5 g palm olein were injected into each pouch before their tops were sealed.

The rice was in pack pasteurized in steam at 97° C., the temperature in the center of the pouch reaching a temperature of 85° C. after 20 minutes and this temperature being hold for 10 minutes.

The pouches were then cooled for 10 minutes in water having a temperature of 10° C. and containing a disinfectant. The pouches were subsequently stored at 25° C.

The rice product could be prepared for consumption by unpacking and heating up.

The rice did not stick together. It had outstanding organoleptical properties, especially a texture similar to the texture of freshly cooked Thai fragrant rice.

Example 2

A precooked rice product having a long shelf life was made from a commercially available short grain Italian Camolino rice having a dry matter content of 86.7%.

The rice was soaked at a rate of one part of rice for three parts of soft water at 50° C. for 1 h. The water uptake during soaking was such that the rice had a dry matter content of from about 66.4%.

The rice was portioned or dosed in 89 g portions.

The rice was then blanched at about 98° C. for 6 minutes along a tunnel blancher in which steam injection means injected steam at 99° C. and water spraying means sprayed acidified water having a pH range of 4.0 to 4.5 and a temperature of 96 to 97° C.

During the blanching step, the water uptake was such that the rice had then a dry matter content of 43.4%.

After the blanching step, the rice was water cooled in a bath of water at 20° C. for 45 seconds.

During the water cooling step, the water uptake was such that the rice had a dry matter content of 41.4%.

After water cooling, excess water was drained off for 60 seconds.

The rice was then dipped into a water containing 0.8% lactic acid and having a temperature of 30° C., for 105 seconds.

During the acidifying step, the water uptake was such that the rice had a dry matter content of 41.2%.

After the acidifying step, excess acidified water was drained off for 60 seconds.

After the acidifying step the rice had a pH of 4.0.

The rice portions then weighing about 150 g were dosed into vertical pouches after their bottoms had been sealed, and 1.5 g palm olein were injected into each pouch before their tops were sealed.

The rice was in pack pasteurized in steam at 97° C., the temperature in the center of the pouch reaching a temperature of 85° C. after 20 minutes and this temperature being hold for 10 minutes.

The pouches were then cooled for 10 minutes in water having a temperature of 10° C. and containing a disinfectant. The pouches were subsequently stored at 25° C.

The rice product could be prepared for consumption by unpacking and heating up.

The rice did not stick together. It had outstanding organoleptical properties, especially a texture similar to the texture of freshly cooked Camolino rice.

What is claimed is:

1. A full moisture shelf stable rice product, which comprises a cooked or precooked whole grain rice having a dry matter content of from about 30% to about 55% by weight, an acid in amount effective to obtain a pH of about 3.5 to about 4.5, and an oil in an amount sufficient to coat the surface of the rice.

2. A rice product according to claim 1, in which the pH is about 3.8 to about 4.3.

3. A rice product according to claim 1, in which the acid is a food grade acid.

4. A rice product according to claim 3, in which the food grade acid is lactic acid, phosphoric acid, citric acid, or Glucono-delta-lactone.

5. A rice product according to claim 1, which comprises about 0.5% to about 5% of the oil, in percent by weight of the cooked or precooked grain.

6. A rice product according to claim 1, in which the oil is a vegetable oil.

7. A rice product according to claim 6, in which the oil is peanut oil, rapeseed oil, sunflower oil, palm oil, corn oil, palm olein, or mixtures thereof.

8. A process of manufacturing a full moisture shelf stable rice product comprising the steps of: soaking whole grain rice in water, portioning the rice into predetermined amounts, blanching the portioned rice, cooling the blanched rice to a predetermined temperature with water, contacting the rice with acidified water to impart a pH of between about 3.5 and about 4.5 so that the rice has a dry matter content of from about 30% to about 55% by weight, treating the rice with an oil in an amount effective to coat the surface of the rice and form a rice product, packaging the rice product in a package, and treating the packages under conditions effective to achieve pasteurization of the rice product.

9. The process of claim 8, wherein the rice is soaked at a ratio of about one part of rice for about one to four parts of water at about 30° C. to about 60° C. for about 30 minutes to about 5 hours.

10. The process of claim 8, wherein the blanching step is carried out at about 95° C. to about 100° C. for about 1 minute to about 10 minutes, while steaming with steam at about 98° C. to about 100° C. and spraying water at about 95° C. to about 98° C.

11. The process of claim 10, wherein the spraying water has a pH of about 3.5 to about 5.

12. The process of claim 8, wherein the acidified water contains about 0.5% to about 2% acid.

13. The process of claim 12, wherein the acid in the acidified water is lactic acid, phosphoric acid, citric acid, or Glucono-delta-lactone.

14. The process of claim 8, wherein the rice is dipped into the acidified water for from about 50 seconds to about 250 seconds to achieve the recited pH.

15. The process of claim 14, wherein the temperature of the acidified water is about 18° C. to about 35° C.

16. The process of claim 15, wherein the rice is in pack pasteurized using steam and maintaining the temperature in the center of the pouch at from about 80° C. to about 100° C. for from about 1 minute to 80 minutes.

* * * * *